UNITED STATES PATENT OFFICE.

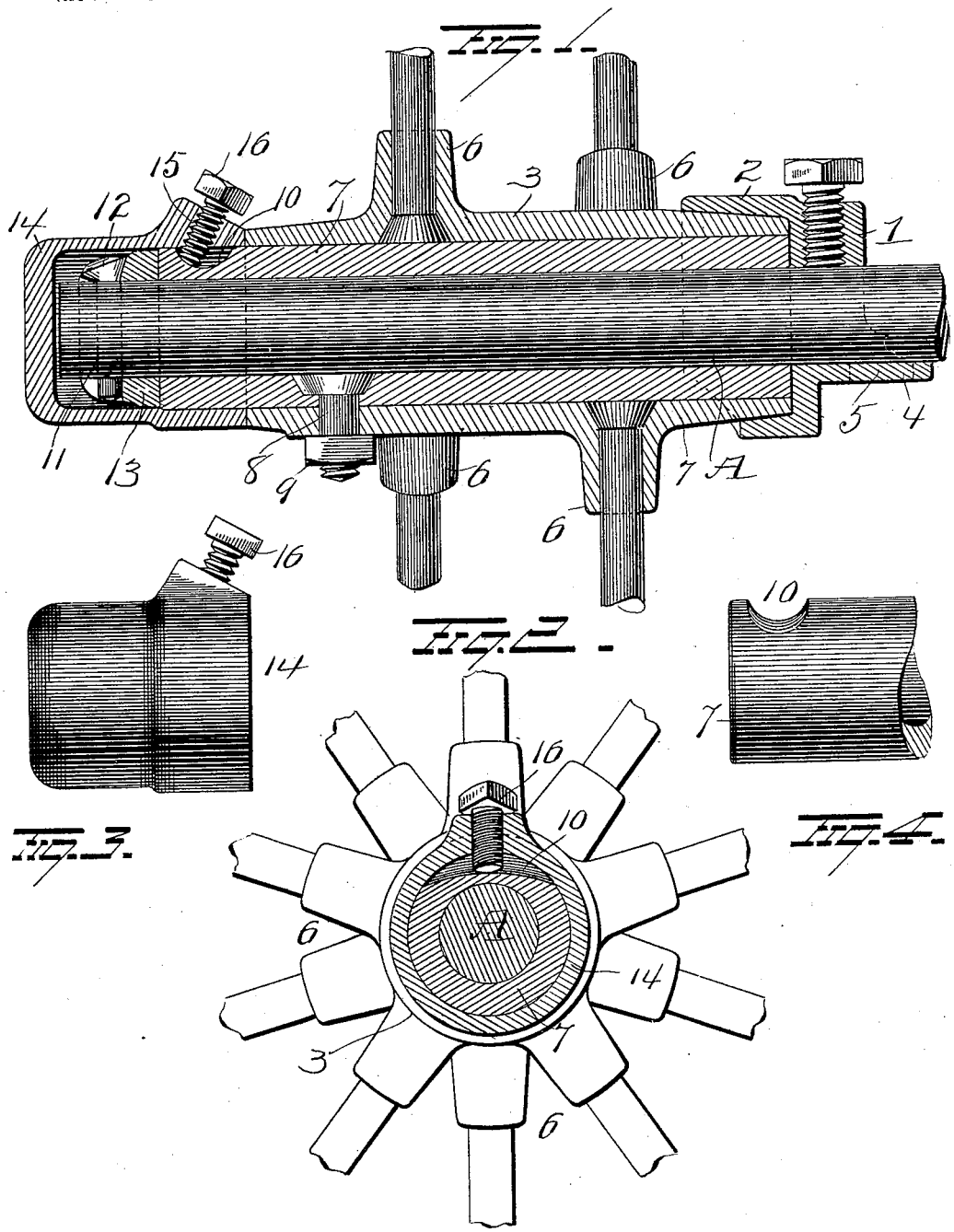

CALVIN R. DAVIS, OF SOUTH BEND, INDIANA, ASSIGNOR TO THE SOUTH BEND IRON WORKS, OF SAME PLACE.

WHEEL.

SPECIFICATION forming part of Letters Patent No. 631,986, dated August 29, 1899.

Application filed July 3, 1899. Serial No. 722,707. (No model.)

*To all whom it may concern:*

Be it known that I, CALVIN R. DAVIS, of South Bend, in the county of St. Joseph and State of Indiana, have invented certain new and useful Improvements in Wheels; and I do hereby declare the following to be a full, clear, and exact description of the invention, such as will enable others skilled in the art to which it appertains to make and use the same.

My invention relates to an improvement in wheels, the object of the invention being to provide an improved wheel which will when mounted on an axle effectually exclude dirt and grit therefrom and at the same time retain lubricant therein.

A further object is to provide an improved means for mounting a wheel on its axle, which shall comprise but few parts and be extremely simple in construction, cheap to manufacture, and most effectual when in use.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a view in section, and Figs. 3 and 4 are detail views.

A represents a spindle or axle, which has secured thereon a sand-band 1. The sand-band 1 is made with a shield 2, to partially inclose the hub 3, and a bracket 4, provided with suitable holes or openings 5 for the reception of screws or bolts to secure the band to a vehicle. The hub 3 is provided around its periphery with two rows of bosses 6 for the reception of spokes, and an axle-box 7 is secured in the hub 3 by means of a countersunk bolt 8 passing through the box 7 and hub 3 and secured in place by a nut 9. The box 7 projects outward beyond the end of the hub 3 and is provided with a groove 10 for a purpose more fully hereinafter explained. The spindle or axle A projects outward beyond the end of the box 7 a suitable distance and is provided with a hole or opening 11 for the reception of a headed pin 12 for holding a notched washer 13 on the end of the spindle. The notched washer 13 abuts against the end of the box 7 to hold the hub against longitudinal movement. A dust-cap 14 is adapted to inclose the end of the spindle A, the notched washer 13, and the protruding end of the box 7, and said cap 14 is provided in one side with an inclined screw-threaded hole 15 for the reception of a set-screw 16, adapted to abut against one wall of the groove 10 and force the cap 14 tightly against the hub 3 and effectually prevent the entrance of dust and grit and at the same time effectually preventing the escape of lubricant.

It will thus be seen that every partial turn of the set-screw 16 serves to tighten the cap 14 against the hub 3 and that the cap can readily be removed when desired.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a wheel-hub, of a box secured therein and having a groove near one end, a cap disposed over the end of said box and a diagonally-disposed set-screw in said cap adapted to abut against one wall of said groove and hold the cap tight against the hub.

2. The combination with a wheel-hub, of a box secured therein and projecting therefrom, a spindle on which said box is mounted having a hole near its outer end, a notched washer secured on the end of the spindle and held against the box by means of a pin passing through the hole in the spindle, and a cap inclosing the end of the spindle, notched washer and box and held in place by a diagonally-disposed set-screw.

3. The combination with a wheel-hub, of a box secured therein, a spindle on which said box is mounted, a sand-band inclosing the inner end of the hub, and a dust-cap on the end of said box and a diagonally-disposed set-screw adapted to pass through the cap engage the box and hold the cap against the hub.

In testimony whereof I have signed this specification in the presence of two subscribing witnesses.

CALVIN R. DAVIS.

Witnesses:
 EDWIN NICAR,
 MICHAEL M. MATTHEWS.